United States Patent [19]

Miyabayashi

[11] Patent Number: 5,045,643
[45] Date of Patent: Sep. 3, 1991

[54] POSITIONAL INFORMATION INPUTTING DEVICE USING SHEET-LIKE PHOTO-CONDUCTIVE SWITCH OR THE LIKE

[75] Inventor: Takeshi Miyabayashi, Nagoya, Japan

[73] Assignee: Brother Kogyo Kabushiki Kaisha, Japan

[21] Appl. No.: 540,496

[22] Filed: Jun. 19, 1990

[30] Foreign Application Priority Data

Jun. 19, 1989 [JP] Japan .................................. 1-158020
Jun. 19, 1989 [JP] Japan .................................. 1-158021

[51] Int. Cl.⁵ .............................................. G08C 21/00
[52] U.S. Cl. .......................................... 178/18; 178/20
[58] Field of Search .......................... 178/20, 18, 19; 250/215; 200/61.02, DIG. 36

[56] References Cited

U.S. PATENT DOCUMENTS

3,746,867 7/1973 Phela et al. ..................... 250/215 X

Primary Examiner—Stafford D. Schreyer
Attorney, Agent, or Firm—Oliff & Berridge

[57] ABSTRACT

A positional information inputting device uses selective ones of a sheet-like photo-conductive switch, a pressure-sensitive switch and a photo-electric converting device. A sheet-like storage battery is provided which includes a plurality of battery cells arranged in matrix form. The sheet-like photo-conductive switch, for example, has an equal plurality of photo-conductive switching elements provided on one selected side of an anode or a cathode of the storage battery in one-to-one correspondence to the battery cells, and the storage battery and the switch constitute an optical memory having an equal plurality of optical memory cells. The battery cells are uniformly charged to a predetermined voltage, and an optical beam is irradiated onto the switching elements so that the latter are selectively rendered conductive corresponding to the irradiation of the optical beam. The charges in the battery cells are discahrged through the associated switching elements in accordance with the irradiation of the optical beam. Residual amounts of charges in the battery cells after the battery cells have been discharged are measured to indicate positional information inputted by the optical beam.

26 Claims, 8 Drawing Sheets

POSITIONAL INFORMATION INPUTTING DEVICE USING SHEET-LIKE PHOTO-CONDUCTIVE SWITCH OR THE LIKE

BACKGROUND OF THE INVENTION

The present invention relates to a positional information inputting device.

A digitizer has conventionally been known in the art as a two-dimensional positional information inputting device in which positional information is inputted with an input pen or a stylus while tracing a tablet on which magnetostrictive lines of a magnetostrictive alloy extend in both X—and Y-direction.

In such a positional information inputting device, however, there is a limitation in reducing a spacing between adjacent magnetostrictive lines, because a radius of the magnetostrictive line and electromagnetic induction have been utilized in inputting the positional information, with the result being that a problem exists such that an input resolution is unsatisfactorily low. Further, when the positional information is manually inputted using a pen, it has been extremely difficult to add density gradation information corresponding to writing pressure applied when points or line segments are drawn by the pen. Moreover, the conventional device is not provided with a function to instantaneously reproduce the positional information immediately after the same is inputted.

SUMMARY OF THE INVENTION

The present invention has been made to solve the above problems, and it is an object of this invention to provide a positional information inputting device which is capable of enhancing resolution of positional information being inputted.

Another object of the invention is to provide a positional information inputting device in which density gradation can be given when points and line segments are manually inputted.

Still another object of the invention is to provide a positional information inputting device which can instantaneously reproduce the inputted positional information.

To achieve the above and other objects, there is provided, in accordance with one aspect of the invention, a positional information inputting device comprising a sheet-like storage battery including a plurality of battery cells arranged in matrix form, each battery cell having an anode, a cathode, an anode-connected collector, and a cathode-connected collector, sheet-like photo-conductive switching means having equal plurality of photo-conductive switching elements provided in one-to-one correspondence to the battery cells, the photo-conductive switching elements being provided on one of the anode-connected and the cathode-connected collectors, wherein the storage battery and the switching means constitute an optical memory having an equal plurality of optical memory cells, charging means for charging the battery cells, irradiating means for irradiating an optical beam onto the switching elements, the switching elements being selectively rendered conductive corresponding to the irradiation of the optical beam, discharge means for discharging the battery cells having been charged by the charging means through the associated switching elements in accordance with the irradiation of the optical beam onto the battery cells, and measurement means for measuring residual amounts of charges in the battery cells after the battery cells are discharged by the discharged means wherein the residual amounts thereof indicate positional information. The device further comprises electrically conductive means having an equal plurality of conductors provided on the remaining one of the cathode-connected and the anode-connected collectors in one-to-one correspondence to the optical memory cells, electrical resistances of the conductors being variable, a developing electrode provided in surface contact with the conductors, recharging means for recharging the battery cells by amounts equal to the amounts of charges measured by the measurement means, and control means for controlling the electrically conductive means so that the electrical resistances of the conductors are selectively lowered, thereby allowing the charges recharged in the battery cells to be discharged through the developing electrode.

In the device using the photo-conductive switching means, the battery cells are uniformly charged by means of an external power supply. Thereafter, the optical beam is irradiated onto the switching means using a light pen to thereby selectively render the switching elements ON, so that the charges in the battery cells onto which the optical beam is irradiated are discharged. Amounts of discharges from the battery cells are determined by resistances of the switching elements which resistances are determined by the light intensity of the optical beam. The amount of the discharges are also determined by the duration of the light irradiation. In order to recognize a charge amount distribution in the storage battery, the battery cells are individually discharged to the predetermined voltage, thereby obtaining a bit map information. With the device as described above, resolution regarding the input or incident positions of the optical beam can be enhanced. Further, since the amounts of discharges from the battery cells are determined depending upon the light intensity of the optical beam and the duration of the light irradiation, density gradation of the inputted information is available. With the provision of the developing electrode, the optical latent image formed in the battery cells can be developed to provide a visible image.

According to another aspect of the present invention, there is provided a positional information inputting device comprising a sheet-like storage battery including a plurality of battery cells arranged in matrix form, each battery cell having an anode, a cathode, an anode-connected collector, and a cathode-connected collector, sheet-like photo-electric converting means having an equal plurality of photo-electric converting elements provided in one-to-one correspondence to the battery cells, the photo-electric converting elements being provided on one of the anode-connected and the cathode-connected collectors, wherein the storage battery and the converting means constitute an optical memory having an equal plurality of optical memory cells, irradiating means for irradiating an optical beam onto the converting elements, the converting elements selectively charging the associated battery cells corresponding to the irradiation of the optical beam, and measurement means for measuring amounts of charges in the battery cells while discharging the battery cells to a predetermined voltage. The device further comprises electrically conductive means having an equal plurality of conductors provided on the remaining one of the cathode-connected and the anode-connected collectors in one-to-one correspondence to the optical memory cells, electrical resistances of the conductors being variable, a developing electrode provided in surface contact with the conductors, recharging means for recharging the battery cells by amounts equal to the amounts of charges measured by the measurement means, and control means for controlling the electrically conductive means so that the electrical resistances of the conductors are selectively lowered, thereby allowing the charges recharged in the battery cells to be discharged through the developing electrode.

According to still another aspect of the invention, there is provided a positional information inputting device comprising a sheet-like storage battery including a plurality of battery cells arranged in matrix form, each battery cell having an anode, a cathode, an anode-connected collector, and a cathode-connected collector, sheet-like pressure-sensitive switching means having an equal plurality of pressure-sensitive switching elements provided in one-to-one correspondence to the battery cells, the pressure-sensitive switching elements being provided on one of the the anode-connected and cathode-connected collectors, wherein the storage battery and the switching means constitute a memory having an equal plurality of memory cells, charging means for charging the battery cells, pressure applying means for applying pressure to the switching elements, the switching elements being selectively rendered conductive corresponding to the pressure applied, discharge means for discharging the battery cells having been charged by the charging means through the associated switching elements in accordance with the pressure applied to the switching elements, and measurement means for measuring residual amounts of charges in the battery cells after the battery cells are discharge by the discharge means wherein the residual amounts thereof indicate positional information. The device further comprises electrically conductive means having an equal plurality of conductors provided on the remaining one of the cathode-connected and the anode-connected collectors in one-to-one correspondence to the memory cells, electrical resistances of the conductors being variable, a developing electrode provided in surface contact with the conductors, recharging means for recharging the battery cells by amounts equal to the amounts of charges measured by the measurement means, and control means for controlling the electrically conductive means so that the electrical resistances of the conductors are selectively lowered, thereby allowing the charges recharged in the battery cells to be discharged through the developing electrode.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIGS. 5(a) through 5(m) show configurations of various layers constituting the optical memory cell and of various parts of electrodes;

DETAILED DESCRIPTION OF THE PREFERRED EMBODIMENTS

FIGS. 1 through 6 show a first embodiment of the present invention.

Figure 1:
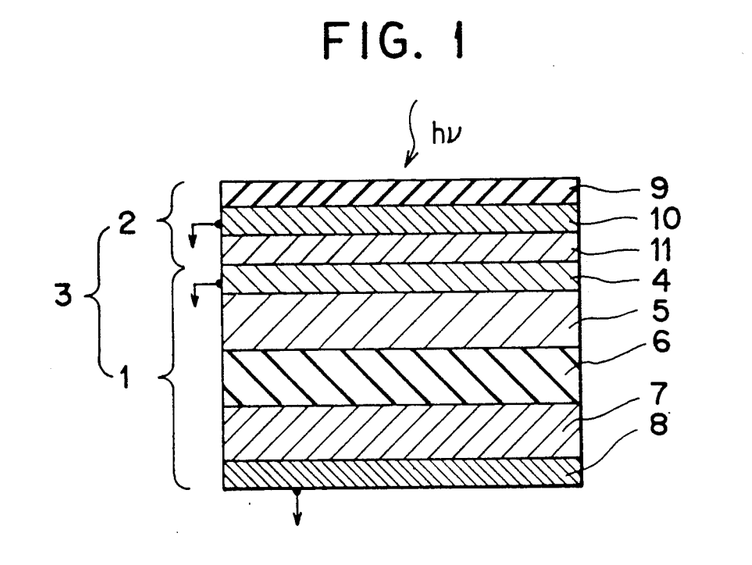
FIG. 1 is a cross-sectional view showing an optical memory cell used in a positional information inputting device according to one embodiment of the present invention.

An optical memory 3 used in the positional information inputting device according to the first embodiment comprises a sheet-like storage battery 1 and a sheet-like photo-conductive switch 2. The storage battery 1 includes a plurality of battery cells arranged in matrix form. The switch 2 serving as a positional information inputting section (hereinafter referred to as "inputting section") has an equal plurality of photo-conductive switching elements provided in one-to-one correspondence to the battery cells.

As shown in FIG. 1, the battery cell 3 comprises a cathode-connected charge collecting layer 8, a cathode layer 7 overlying the collecting layer 8, an electrolyte layer 6 overlying the cathode layer 7, an anode layer 5 overlying the electrolyte layer 6, and an anode-connected charge collecting layer 4 overlying the anode layer 5. The charge collecting layer 4 is made of nickel (Ni). The anode layer 5 is made of $V_6O_{13}$ or $V_2O_5$. The electrolyte layer 6 is made of a polymer electrolyte comprising a polyethylene derivative containing $LiClO_4$. The cathode layer 7 is made of Li-Al alloy. The charge collecting layer 8 is made of nickel.

On the other hand, the inputting section 2 comprises a photo-conductive layer 11, a discharge electrode 10 overlying the photo-conductive layer 11, and a protective film 9 laminated on the discharge electrode 10. The protective film 9 is made of polyester. The discharge electrode 10 is made of a transparent electrically conductive material such as ITO (Indium Tin Oxide). The photo-conductive layer 11 is made of organic photo-conductive material such as $TiO_2$ or ZnO. Positional information is inputted from the protective film 9 by irradiating a light beam onto the protective film 9 as will be described later. In this embodiment, the inputting section or the photo-conductive switch 2 is provided on the collecting layer 4, however, it may be provided on the other collecting layer 8.

Figure 2:
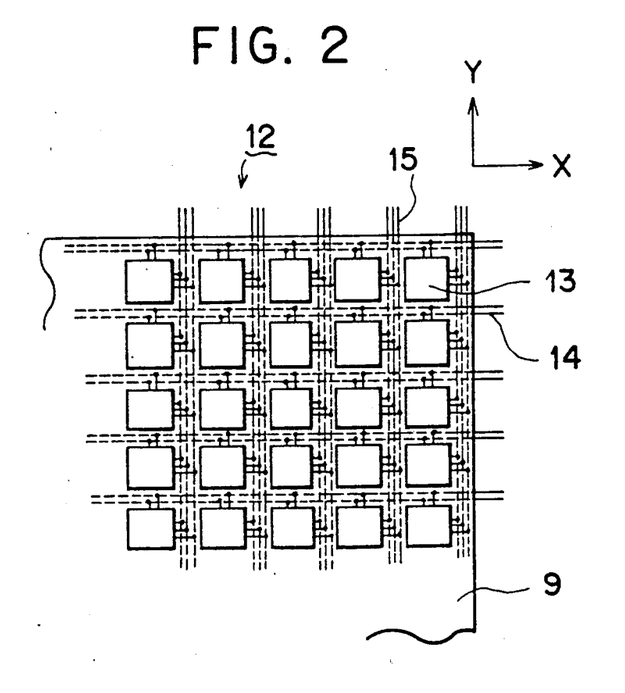
FIG. 2 is a top plan view showing an arrangement of the optical memory cells.

FIG. 2 shows a top plan view showing a positional information inputting sheet member 12 in which a plurality of optical memory cells are arranged in X and Y directions in matrix form. The sheet member 12 includes the protective film 9, the photo-conductive switch 2 having a plurality of photo-conductive switching elements, the storage battery 1 having an equal plurality of battery cells, an equal plurality of thermistor switches being provided in one-to-one correspondence to the optical memory cells, each cell being constituted with the switching element and its associated battery cell, an equal plurality of toner developing electrodes 13 also being provided in one-to-one correspondence to the optical memory cells (a part of the developing electrode 13 is in common to the associated optical memory cell 3), discharge electrodes, cathode-connected collectors, lead-out electrodes 14 made of heat-generating material, anode-connected collectors, and lead-out electrodes 15 made of heat-generating material.

Figure 3:
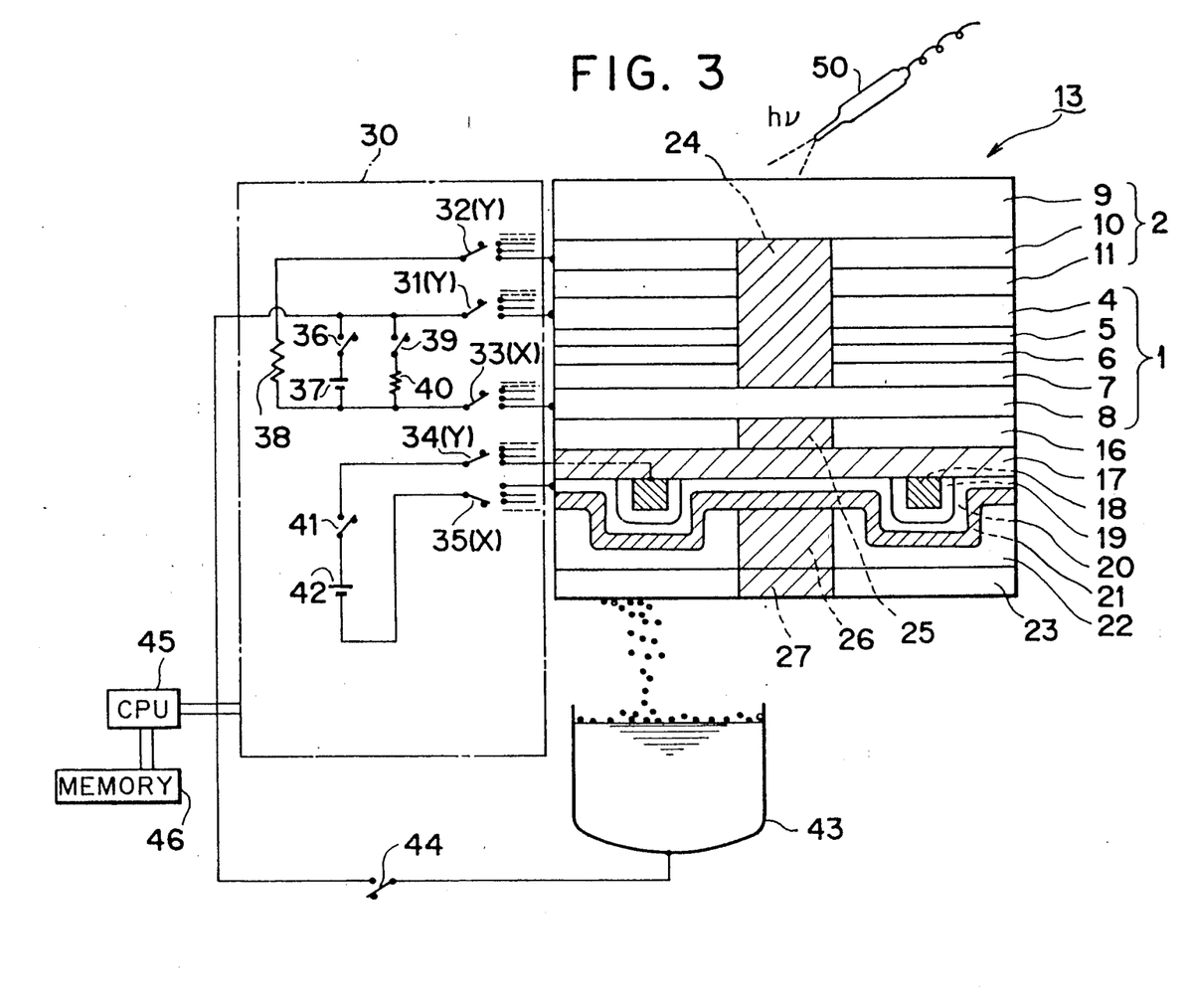
FIG. 3 is an explanatory diagram showing an overall arrangement of the positional information inputting device.

In FIG. 3, multi-conductive layers 16 through 22 whose resistances are variable corresponding to the associated battery cell are provided underlying the cathode-connected collecting layer 8. A toner developing electrode 23 is provided underlying the multi-conductive layers 16-22. The latter serves as a thermistor switch which comprises a thermistor layer 16, an insulating layer 17, a heat-generating electrode 18 extending in Y-direction, a heat-generating member 19, a heat-generating electrode 20 extending in X-direction, an insulating layer 21, and a thermometer layer 22. Reference numerals 24 through 27 denote insulating resists.

Figure 4:
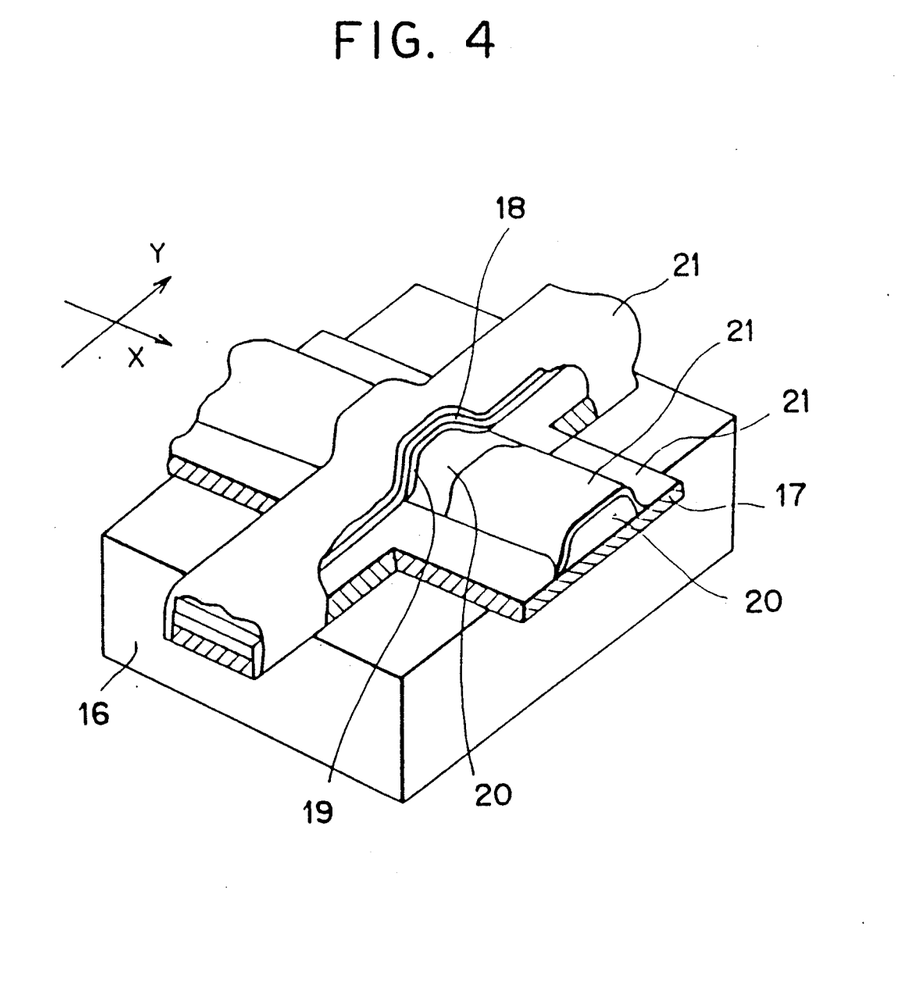
FIG. 4 is a schematic perspective view showing a thermistor switch for individually discharging storage cell units.
Figure 5A:
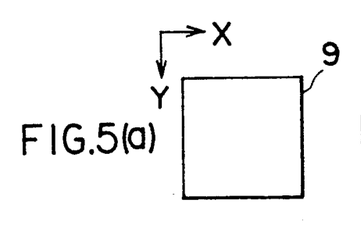
Figure 5B:
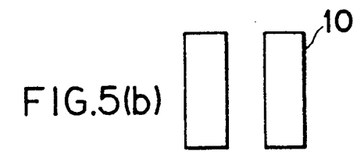
Figure 5C:
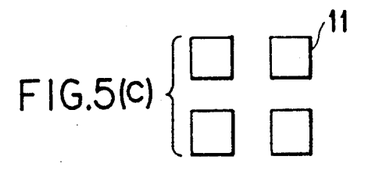
Figure 5D:
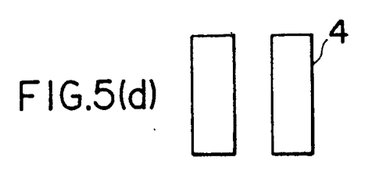
Figure 5E:
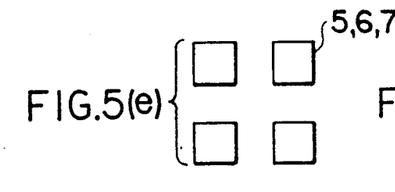
Figure 5F:
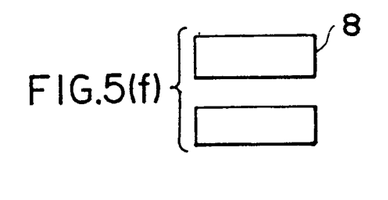
Figure 5G:
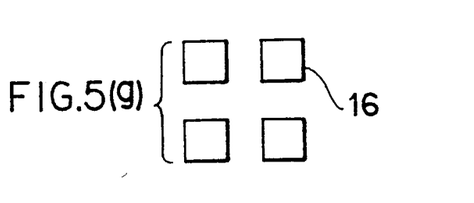
Figure 5H:
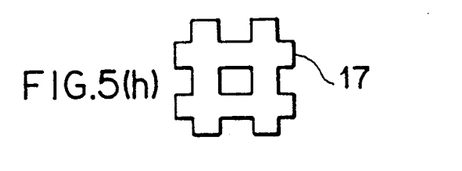
Figure 5I:
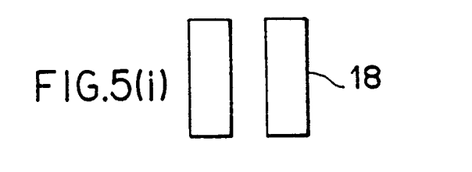
Figure 5J:
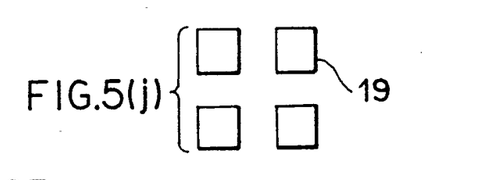
Figure 5K:
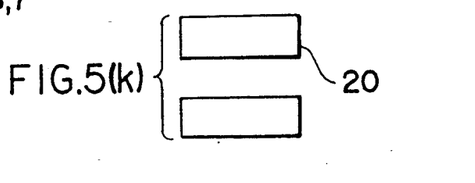
Figure 5L:
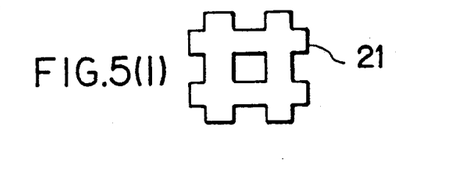
Figure 5M:
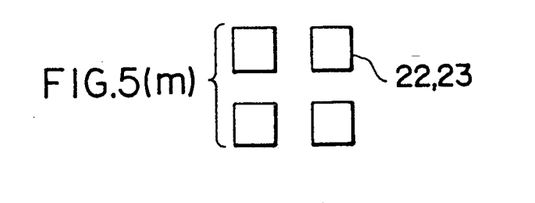

A construction of the thermistor switch is shown in FIG. 4. in which heat is generated in the heat-generating member 19 positioned in the intersection of the X- and Y-directionally extending heat-generating electrodes 20, 18, so that the resistance of the associated thermistor layer is reduced. The configurations of the respective parts of the thermistor switch are shown in FIG. 5.

Figure 6:
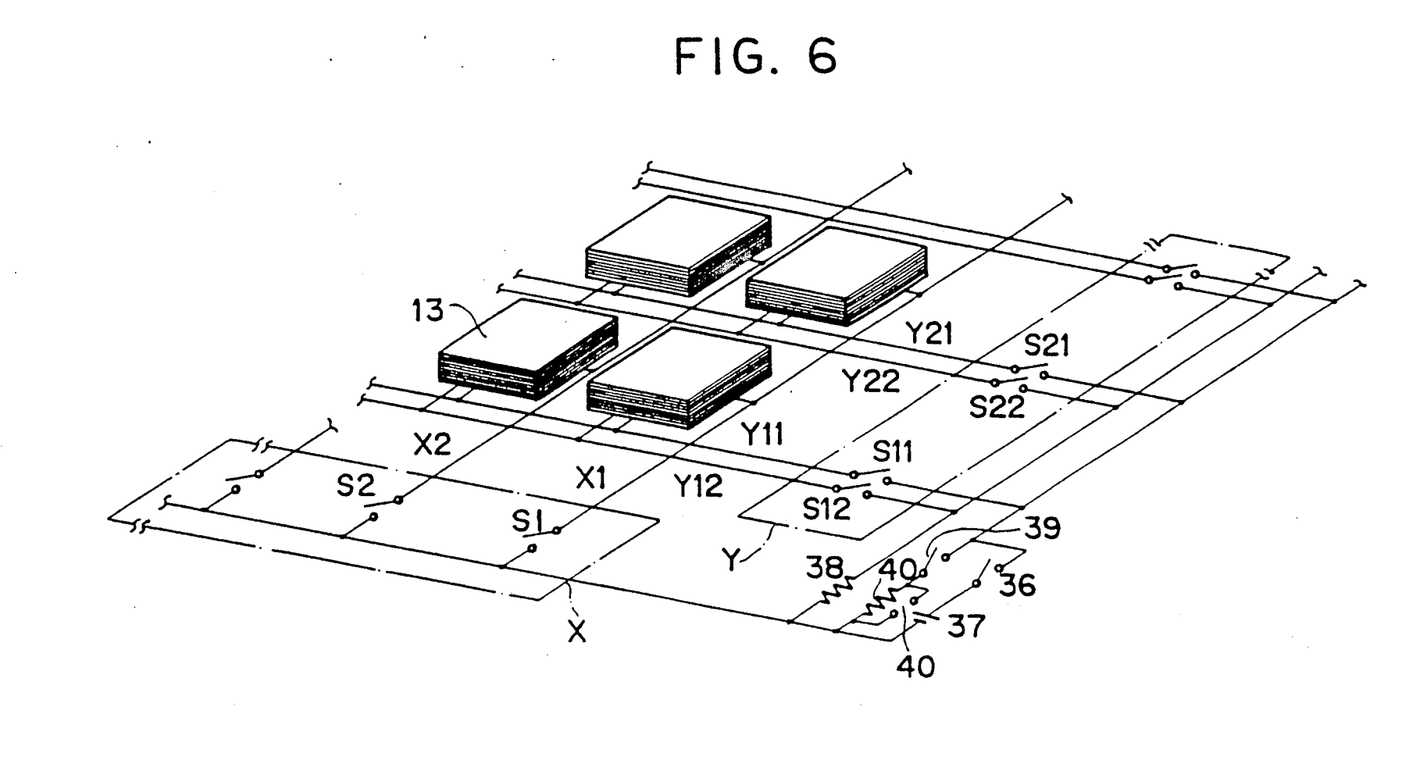
FIG. 6 is a schematic perspective view showing an optical memory and an electrical circuit for use in conjunction therewith.

Referring next to FIGS. 3 and 6. lead-out electrodes and an electrical circuit provided in association therewith will be described. Controller 30 is provided for carrying out a matrix scan for the electrodes extending in X- and Y-direction. Shift registers are employable to this end. In the controller 30, the anode-connected collector 4 and the discharge electrode 10 have switches 31 and 32 (Y-direction), respectively. The cathode-connected collector 8 has a switch 33 (X-direction). Further, the heat-generating electrodes 18 and 20 have switches 34 (Y-direction), and 35 (X-direction) respectively. A switch 36 and an external power supply 37 serve as a charging circuit for charging the storage battery 1 through the switches 31, 33. The resistor 38 operates as a discharge means for discharging the charges in the storage battery through the switches 32, 33 and the inputting section or the photo-conductive switch 2. A switch 39 and a resistor 40 (or a load) serve as a measurement means for individually measuring residual amounts of charges in the battery cells after the battery cells are discharged by the discharge means. The residual amounts of charges therein are measured to derive bit map information from the battery cells. An external power supply 42 is connected to the heat-generating electrodes 18, 20 through the switches 34, 35, respectively, and therefore the heat-generating member 19 generates heat when a switch interposed between the power supply 42 and the switch 34 is closed.

Toner spray 43 and a switch 44 positioned beneath the toner developing electrode 23 serve as a developing unit for performing toner-development on the toner developing electrode 23. The switch 44 is connected to the switch 31. The various switches provided in the controller 30 are controlled by a central processing unit (CPU) 45, and data obtained through the measurement are stored in a memory 46.

In FIG. 6, the switches S1. S2, . . . . . Si correspond to the switch 33, the switches S11. S21, . . . .Si1 to the switch 31, and switches S12, S22, . . . ,Si2 to the switch 32. It should be noted that the measurement is carried out by the CPU 45 which reads the voltage developed across the load 40.

Next, the operation of the device as arranged above will be described.

The switch 36 is rendered ON for a predetermined duration and the switches 31, 33 are sequentially changed over, whereupon a predetermined amount of current is flowed from the external power supply (which is preferably a constant current source) 37 to each of the battery cells 1 and a corresponding amount of electrical energy is stored therein. Next. both the switches 32, 33 are rendered ON and a light beam is irradiated onto the photo-conductive switch 2 while using an input pen 50. Then, the switching elements are selectively rendered ON, whereupon discharges of the corresponding battery cells occur through the associated discharge electrodes 10. The amount of discharges are determined depending upon the intensity of the light beam and the period of time during which the light beam is irradiated thereon. In this manner, a light latent image is formed in the storage battery 1 by way of charge distribution.

Next, in order to derive the light latent image from the storage battery 1 and to provide bit map information, the switch 39 is rendered ON. The switches 31, 33 are sequentially changed over in a predetermined order and the residual amounts of charges in the respective battery cells are measured by measurement of the voltage developed across the load 40. The residual amounts of charges thus measured, which define the bit map information, are stored in the memory 46. Through the above operations, it is possible to manually input information while imposing density gradation thereto.

Next, based on the bit map information obtained, an amount of charges equal to or corresponding to an amount of discharges defined by subtracting the residual amount of charges from an initial amount of charges are recharged in the corresponding battery cells 1 using the external power supply 37. Thereafter, currents are flowed in the heat-generating members 19 from the external power supply 42 while changing over the switches 34, 35, thereby selectively heating the heat-generating members 19 to thus heat the associated thermistor layers 16, 22. Due to the heating of the thermistor layers 16, 22, the electrical resistances thereof are reduced. Then, negative charges are selectively supplied to the developing electrode 23. In this condition, if the switch 44 is switched ON, toner powders contained in the toner spray 43 are adhered to the associated developing electrode 23 due to cataphoresis and electroanalytic effect. In this manner, toner development is carried out. Thereafter, a sheet of paper (not shown) is supplied to the developing electrode 23 to transfer the toner powders thereonto. Reproduction of the image is thus carried out.

When labelling of the positional information is to be performed, a time based index may be given when the positional information is inputted by means of the input pen 50. To this effect, timings at which the switches 32, 33 are sequentially changed over may be determined in advance and addressing of the input position may be implemented.

With an ink-drawable light pen, the positional information can be inputted while visually recognizing the ink-drawn image on the protective film 9.

Figure 7:
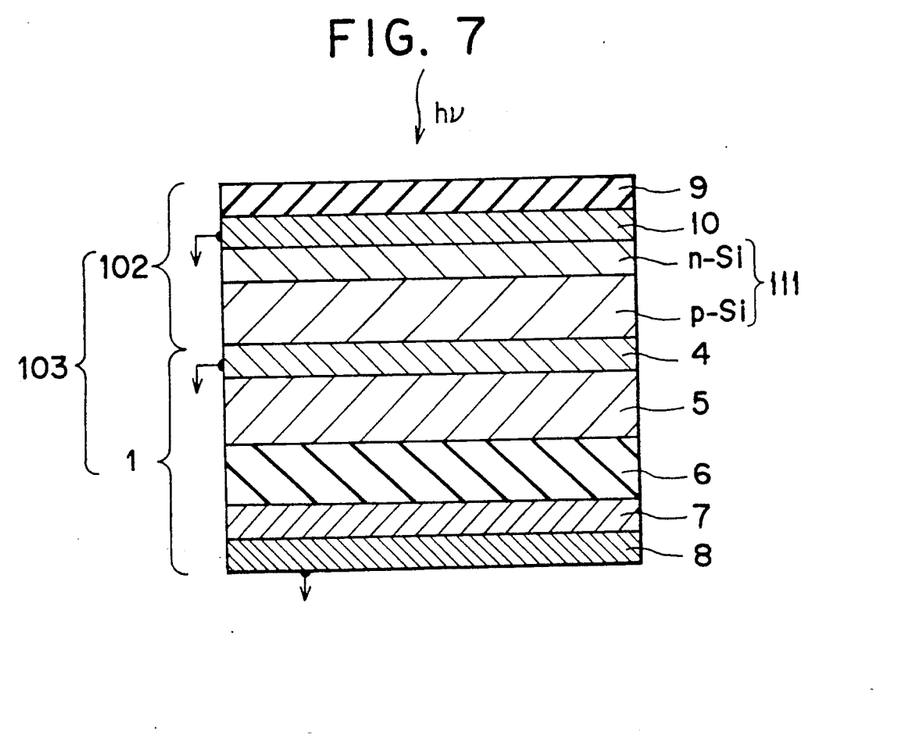
FIG. 7 is a cross-sectional view showing an optical memory cell used in a positional information inputting device according to another embodiment of the present invention.

Next, a second embodiment of the present invention will be described. The second embodiment is similar to the first embodiment but is different therefrom in that a photo-electric converting device is used in lieu of the photo-conductive switch 2. A cross-sectional side elevational view showing a photo-electric converting element is shown in FIG. 7. An optical memory 103 comprises a sheet-like storage battery 1 and a sheet-like photo-electric converting device 102 serving as an inputting section. The inputting section 102 comprises a positive silicon layer (p-Si), a negative silicon layer (n-Si) overlying the positive silicon layer, a transparent electrode layer 10 overlying the negative silicon layer, and a protective film 9 laminated on the transparent electrode layer 10. The negative and positive silicon layers serve as a photo-electric converting element. The arrangement of the layers constituting the battery cell 1 is the same as that illustrated in FIG. 1.

In accordance with the second embodiment, with the charge/discharge circuits made up of the external power supply 37, the switches 36, 39, the load 40, the discharge termination voltage of the battery cells 1 is set to constant. While rendering the switches 32, 33 ON, a light beam is irradiated onto the photo-electric converting layer 111 with the use of the input pen 50 to thereby charge the corresponding battery cell 1. As a result, an optical latent image is formed in the battery 1 in the form of a charge distribution.

A third embodiment of the present invention will next be described. The third embodiment is similar to the second embodiment but is different therefrom in that the optical memory cells are subjected to high-speed matrix scan so that the memory cells are sequentially rendered ON or OFF in a predetermined order, whereupon a light beam is irradiated onto the memory cells. More specifically, in contrast to the second embodiment in which the switches 32, 33 have been rendered ON when the light beam is irradiated onto the memory cells, the switches 32, 33 are subjected to matrix scan in this embodiment. By doing so, the timings at which the respective memory cells are in the ON state can be recognized from time based information. Therefore, positional information of the incident light can be recognized from an X-Y coordinate value.

A fourth embodiment of the present invention will be described. The fourth embodiment is a modification of the first or the second embodiments, wherein the electromotive force of a battery cell is monitored immediately before and after the discharge or the charge by the irradiation of the light beam. The arrangement of the fourth embodiment is similar to that of the preceding embodiments.

Figure 8A:
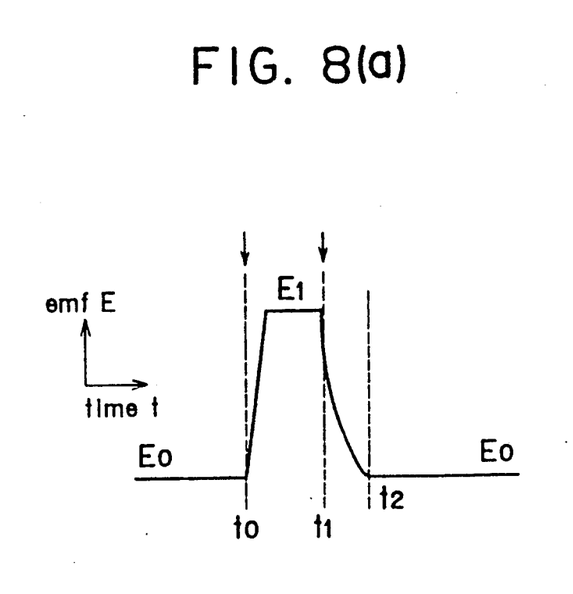
FIGS. 8(a) and 8(b) are diagrams illustrating electromotive force profiles of a battery cell.
Figure 8B:
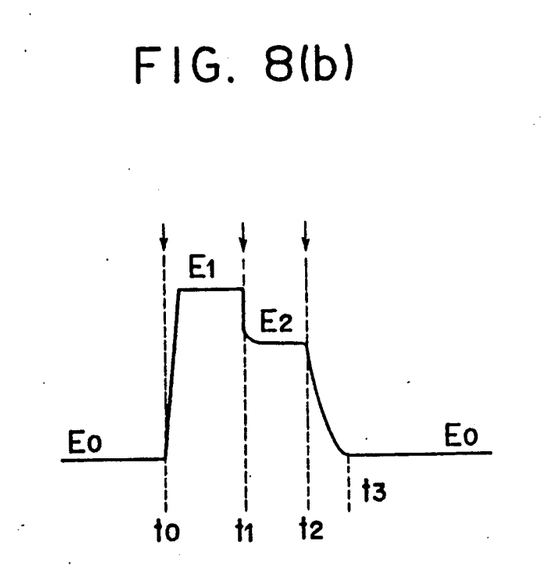

Operation of the fourth embodiment will be described with reference to FIGS. 8(a) and 8(b) showing profiles of electromotive forces of the battery cell. FIG. 8(a) is provided for description of the a light charging type memory device using the photo-electric converting device. At time instant $t_0$, light beam is irradiated on the memory cell, at time instant $t_1$, discharge is commenced for the purpose of measurement of the amount of charges stored in the battery, and at time instant $t_2$, the discharge is terminated. In a strict sense, the electromotive force $E_0$ of the battery before it is charged is not constant due to self-discharge. Therefore, the electromotive force $E_0$ of the battery before it is charged is monitored in this embodiment. After the electromotive force is raised to $E_1$, the discharge is carried out for the purpose of measurement purpose. At this time, if the discharge termination voltage is set to $E_0$, the time $t_2$ at which the discharge is to be terminated can be accurately determined. Therefore, by discharging the battery up to a predetermined voltage, accurate bit map information can be obtained.

FIG. 8(b) is provided for description of the light discharge type memory device using the photo-conductive switch or a pressure-sensitive switch (to be described later). At time instant $t_0$, all the battery cells are charged, at time instant $t_1$, a light beam is irradiated onto the battery cells, at time $t_2$, discharge of the battery is carried out for measuring the charges remaining in the battery cells, and at time instant $t_3$, the discharge is terminated. According to this embodiment, the electromotive force $E_0$ of the battery cells immediately before the battery cells are charged is monitored. The electromotive force increases up to $E_1$, and thereafter it is lowered to $E_2$ caused by the light beam irradiation. If the discharge termination voltage performed for the purpose of measurement of the residual charges can be set to $E_0$, the time $t_3$ can be set accurately and therefore accurate information can be obtained.

Next, a fifth embodiment of the present invention will be described. In the fifth embodiment, a pressure-sensitive switch and a pressurizing input pen are used in lieu of the aforementioned photo-conductive switch or photo-converting device and light beam input pen.

Figure 9:
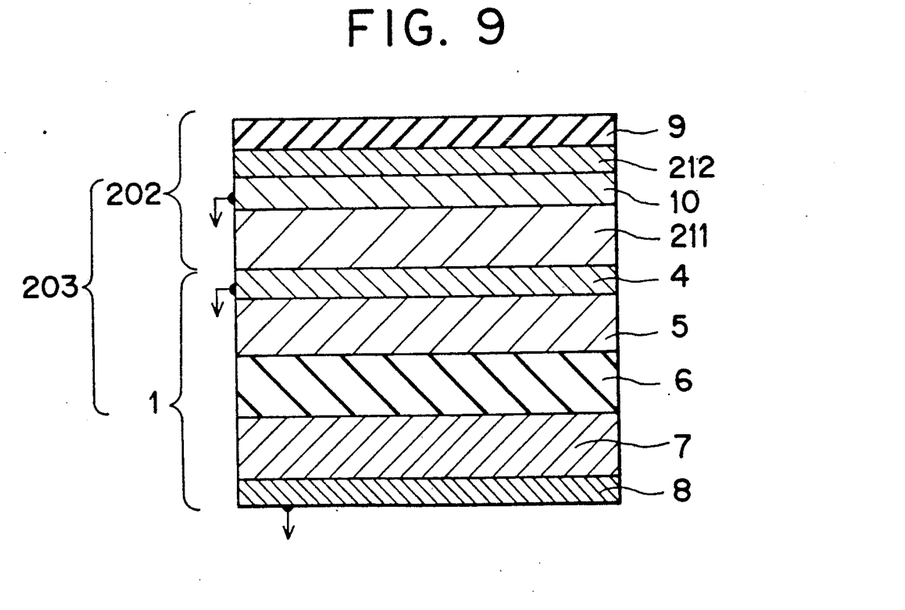
FIG. 9 is a cross-sectional view showing a pressure-sensitive memory cell used in a positional information inputting device according to still another embodiment of the present invention.
Figure 10:
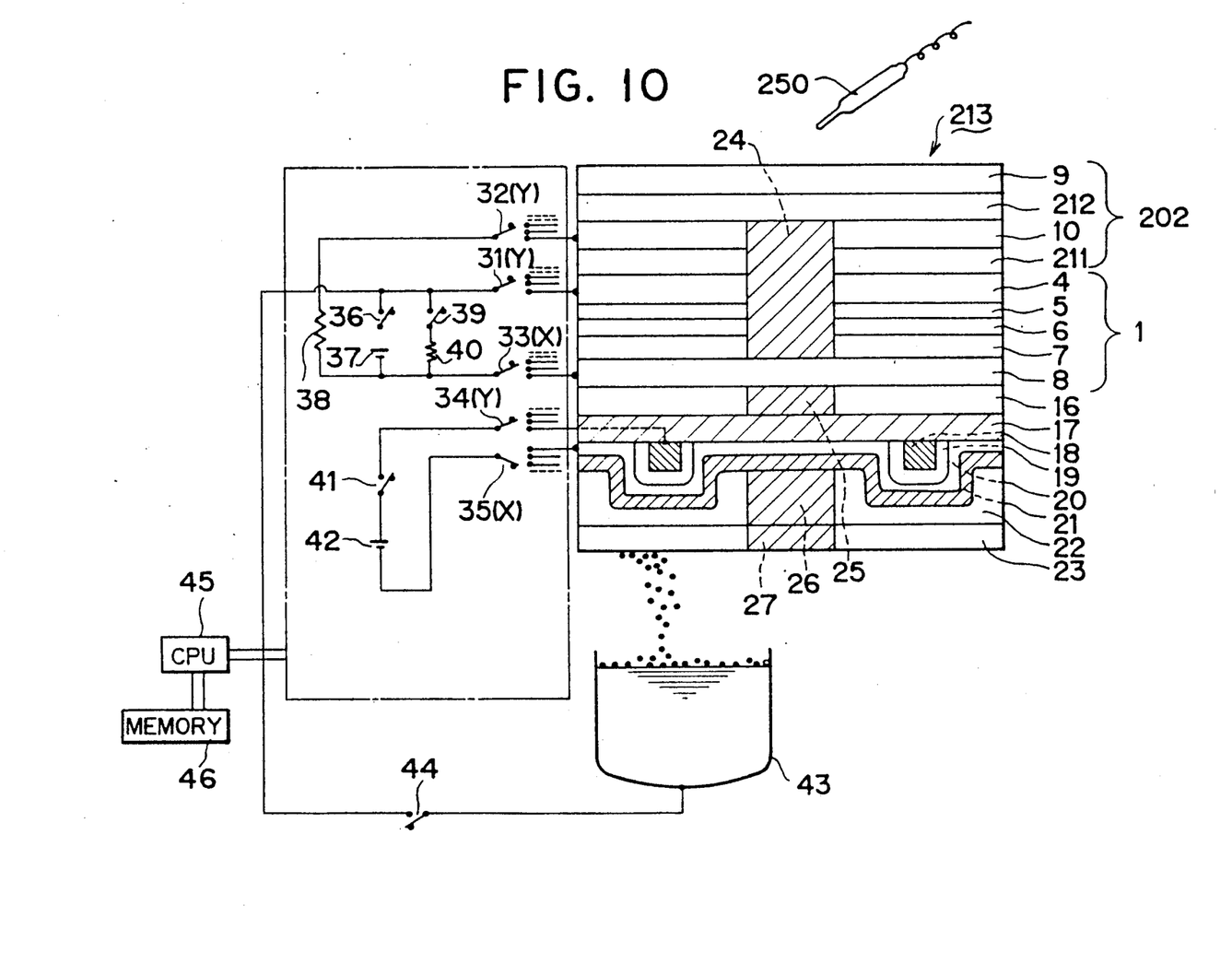
FIG. 10 is an overall arrangement of a positional information inputting device using a pressure-sensitive memory shown in FIG. 9.

FIG. 9 is a cross-sectional side elevational view showing a pressure-sensitive memory cell according to the fifth embodiment. FIG. 10 is an overall arrangement of a positional information inputting device to which the fifth embodiment is applied. As shown, the pressure-sensitive memory 203 comprises a sheet-like storage battery 1 and a sheet-like pressure-sensitive switch 202 serving as an inputting section. The inputting section 202 comprises a pressure-sensitive layer 211, an electrically conductive layer 10 serving as a discharge electrode and overlying the pressure-sensitive layer 211, a white background agent layer 212 overlying the pressure-sensitive layer 211, and a protective film 9 laminated on the white background agent layer 212. The protective film 9 is made of polyester. The white background agent layer 212 contains $TiO_2$. The discharge electrode 10 is made of copper (Cu), nickel (Ni), aluminum (Al) or chromium (Cr). The pressure-sensitive switch layer 211 contains a mixture of carbon and nickel poders each being less than 10 microns. The sheet-like battery 1 includes a plurality of battery cells arranged in matrix form as in the foregoing embodiments. The inputting section 202 is provided in one-to-one correspondence to the battery cells. The pressure-sensitive memory device 203 together with various layers including the thermistor layers 16, 22, and a developing electrode layer 23 makes up the positional information inputting device 213. An input pen 250 imparts pressure onto the protective film 9 to thereby input information. The remaining arrangement of the positional information inputting device is the same as that previously described.

In operation, similar to the discharge type memory device, a predetermined amount of electrical energy is stored in advance in the battery cells 1 while appropriately switching the switches provided in association with the charge/discharge circuit. Then, a pressure is applied to the pressure-sensitive switch 211 with the use of the pressurizing input pen 250, thereby releasing the charges through the discharge electrode 10.

While the present invention has been described with reference to specific embodiments, it should be understood that a variety of changes and modifications may be made without departing from the scope and spirit of the present invention.

What is claimed is:

1. A positional information inputting device comprising:
 a sheet-like storage battery including a plurality of battery cells arranged in matrix form, each battery cell having an anode, a cathode, an anode-connected collector, and a cathode-connected collector;
 sheet-like photo-conductive switching means having an equal plurality of photo-conductive switching elements provided in one-to-one correspondence to the battery cells, said photo-conductive switching elements being provided on one of the anode-connected and the cathode-connected collectors, wherein said storage battery and said switching means constitute an optical memory having an equal plurality of optical memory cells;
 charging means for charging the battery cells;
 irradiating means for irradiating an optical beam onto the switching elements, the switching elements being selectively rendered conductive corresponding to the irradiation of the optical beam;
 discharge means for discharging the battery cells having been charged by said charging means through the associated switching elements in accordance with the irradiation of the optical beam onto the battery cells; and
 measurement means for measuring residual amounts of charges in the battery cells after the battery cells are discharge by said discharged means wherein the residual amounts thereof indicate positional information.

2. A positional information inputting device according to claim 1, further comprising monitoring means for monitoring an electromotive force of a battery cell immediately before said battery cell is charged by said charging means and an electromotive force thereof immediately after said battery cell is discharged in accordance with the irradiation of the optical beam onto the associated switching element.

3. A positional information inputting device according to claim 1, wherein each battery cell comprises a cathode-connected charge collecting layer, a cathode layer overlying said collecting layer, an electrolyte layer overlying said cathode layer, an anode layer overlying said electrolyte layer, and an anode-connected charge collecting layer overlying said anode layer.

4. A positional information inputting device according to claim 3, wherein the photo-conductive switching element comprises a photo-conductive layer, an electrically conductive layer overlying said photo-conductive layer, and a protective film laminated on said electrically conductive layer.

5. A positional information inputting device comprising:
 a sheet-like storage battery including a plurality of battery cells arranged in matrix form, each battery cell having an anode, a cathode, an anode-connected collector, and a cathode-connected collector;
 sheet-like photo-electric converting means having an equal plurality of photo-electric converting elements provided in one-to-one correspondence to the battery cells, said photo-electric converting elements being provided on one of the anode-connected and the cathode-connected collectors, wherein said storage battery and said converting means constitute an optical memory having an equal plurality of optical memory cells;
 irradiating means for irradiating an optical beam onto the converting elements, the converting elements selectively charging the associated battery cells corresponding to the irradiation of the optical beam; and
 measurement means for measuring amounts of charges in the battery cells while discharging the battery cells to a predetermined voltage.

6. A positional information inputting device according to claim 5, further comprising monitoring means for monitoring an electromotive force of a battery cell immediately before said battery cell is charged and an electromotive force thereof immediately after said battery cell is discharged.

7. A positional information inputting device according to claim 5, wherein each battery cell comprises a cathode-connected charge collecting layer, a cathode layer overlying said collecting layer, an electrolyte layer overlying said cathode layer, an anode layer overlying said electrolyte layer, and an anode-connected charge collecting layer overlying said anode layer.

8. A positional information inputting device according to claim 7, wherein the converting element comprises a positive silicon layer, a negative silicon layer overlying said positive silicon layer, a transparent electrode layer overlying said negative silicon layer, and a protective film laminated on said transparent electrode layer.

9. A positional information inputting device according to claim 5, further comprising enabling means for sequentially enabling the optical memory cells in a predetermined order, and wherein the optical beam is irradiated onto the converting elements when the optical memory cells are being sequentially enabled.

10. A positional information inputting device comprising:
 a sheet-like storage battery including a plurality of battery cells arranged in matrix form, each battery cell having an anode, a cathode, an anode-connected collector, and a cathode-connected collector;
 sheet-like pressure-sensitive switching means having an equal plurality of pressure-sensitive switching elements provided in one-to-one correspondence to the battery cells, said pressure-sensitive switching elements being provided on one of the anode-connected and the cathode-connected collectors, wherein said storage battery and said switching means constitute a memory having an equal plurality of memory cells;
 charging means for charging the battery cells;
 pressure applying means for applying pressure to the switching elements, the switching elements being selectively rendered conductive corresponding to the pressure applied;
 discharge means for discharging the battery cells having been charged by said charging means through the associated switching elements in accordance with the pressure applied to the switching elements; and measurement means for measuring residual amounts of charges in the battery cells after the battery cells are discharged by said discharge means wherein the residual amounts thereof indicate positional information.

11. A positional information inputting device according to claim 10, further comprising monitoring means for monitoring an electromotive force of a battery cell immediately before said battery cell is charged by said charging means and an electromotive force thereof immediately after said battery cell is discharged in accordance with the pressure applied to the associated switching element.

12. A positional information inputting device according to claim 10, wherein each battery cell comprises a cathode-connected charge collecting layer, a cathode layer overlying said collecting layer, an electrolyte layer overlying said cathode layer, an anode layer overlying said electrolyte layer, and an anode-connected charge collecting layer overlying said anode layer.

13. A positional information inputting device according to claim 12, wherein the pressure-sensitive switching element comprises a pressure-sensitive layer, an electrically conductive layer overlying said pressure-sensitive layer, a white background agent layer overlying said electrically conductive layer, and a protective film laminated on said white background agent layer.

14. A positional information inputting device comprising:
a sheet-like storage battery including a plurality of battery cells arranged in matrix form, each battery cell having an anode, a cathode, an anode-connected collector, and a cathode-connected collector;
sheet-like photo-conductive switching means having an equal plurality of photo-conductive switching elements provided in one-to-one correspondence to the battery cells, said photo-conductive switching elements being provided on one of the anode-connected and the cathode-connected collectors, wherein said storage battery and said switching means constitute an optical memory having an equal plurality of optical memory cells;
charging means for charging the battery cells;
irradiating means for irradiating an optical beam onto the switching elements, the switching elements being selectively rendered conductive corresponding to the irradiation of the optical beam;
discharge means for discharging the battery cells having been charged by said charging means through the associated switching elements in accordance with the irradiation of the optical beam onto the battery cells;
electrically conductive means having an equal plurality of conductors provided on a remaining one of the cathode-connected and the anode-connected collectors in one-to-one correspondence to the optical memory cells, electrical resistances of the conductors being variable;
a developing electrode provided in surface contact with the conductors;
measurement means for measuring residual amounts of charges in the battery cells after the battery cells are discharged by said discharge means;

recharging means for recharging the battery cells by amounts equal to the amounts of charges measured by said measurement means; and control means for controlling said electrically conductive means so that the electrical resistances of the conductors are selectively lowered, thereby allowing the charges recharged in the battery cells to be discharged through said developing electrode.

15. A positional information inputting device according to claim 14, further comprising monitoring means for monitoring an electromotive force of a battery cell immediately before said battery cell is charged by said charging means and an electromotive force thereof immediately after said battery cell is discharged in accordance with the irradiation of the optical beam onto the associated switching element.

16. A positional information inputting device according to claim 14, wherein each battery cell comprises a cathode-connected charge collecting layer, a cathode layer overlying said collecting layer, an electrolyte layer overlying said cathode layer, an anode layer overlying said electrolyte layer, and an anode-connected charge collecting layer overlying said anode layer.

17. A positional information inputting device according to claim 16, wherein the photo-conductive switching element comprises a photo-conductive layer, an electrically conductive layer overlying said photo-conductive layer, and a protective film laminated on said electrically conductive layer.

18. A positional information inputting device comprising:
a sheet-like storage battery including a plurality of battery cells arranged in matrix form, each battery cell having an anode, a cathode, an anode-connected collector, and a cathode-connected collector;
sheet-like photo-electric converting means having an equal plurality of photo-electric converting elements provided in one-to-one correspondence to the battery cells, said photo-electric converting elements being provided on one of the anode-connected and the cathode-connected collectors, wherein said storage battery and said converting means constitute an optical memory having an equal plurality of optical memory cells;
irradiating means for irradiating an optical beam onto the converting elements, the converting elements selectively charging the associated battery cells corresponding to the irradiation of the optical beam;
electrically conductive means having an equal plurality of conductors provided on a remaining one of the cathode-connected and the anode-connected collectors in one-to-one correspondence to the optical memory cells, electrical resistances of the conductors being variable;
a developing electrode provided in surface contact with the conductors;
measurement means for measuring amounts of charges in the battery cells while discharging the battery cells to a predetermined voltage;
recharging means for recharging the battery cells by amounts equal to the amounts of charges measured by said measurement means; and
control means for controlling said electrically conductive means so that the electrical resistances of the conductors are selectively lowered, thereby allowing the charges recharged in the battery cells to be discharged through said developing electrode.

19. A positional information inputting device according to claim 18, further comprising monitoring means for monitoring an electromotive force of a battery cell immediately before said battery cell is charged and an electromotive force thereof immediately after said battery cell is discharged.

20. A positional information inputting device according to claim 18, wherein each battery cell comprises a cathode-connected charge collecting layer, a cathode layer overlying said collecting layer, an electrolyte layer overlying said cathode layer, an anode layer overlying said electrolyte layer, and an anode-connected charge collecting layer overlying said anode layer.

21. A positional information inputting device according to claim 20, wherein the converting element comprises a positive silicon layer, a negative silicon layer overlying said positive silicon layer, a transparent electrode layer overlying said negative silicon layer, and a protective film laminated on said transparent electrode layer.

22. A positional information inputting device according to claim 18, further comprising enabling means for sequentially enabling the optical memory cells in a predetermined order, and wherein the optical beam is irradiated onto the converting elements when the optical memory cells are being sequentially enabled.

23. A positional information inputting device comprising:

a sheet-like storage battery including a plurality of battery cells arranged in matrix form, each battery cell having an anode, a cathode, an anode-connected collector, and a cathode-connected collector;

sheet-like pressure-sensitive switching means having an equal plurality of pressure-sensitive switching elements provided in one-to-one correspondence to the battery cells, said pressure-sensitive switching elements being provided on one of the anode-connected and the cathode-connected collectors, wherein said storage battery and said switching means constitute a memory having an equal plurality of memory cells;

charging means for charging the battery cells;

pressure applying means for applying pressure to the switching elements, the switching elements being selectively rendered conductive corresponding to the pressure applied;

discharge means for discharging the battery cells having been charged by said charging means through the associated switching elements in accordance with the pressure applied to the switching elements;

electrically conductive means having an equal plurality of conductors provided on a remaining one of the cathode-connected and the anode-connected collectors in one-to-one correspondence to the memory cells, electrical resistances of the conductors being variable;

a developing electrode provided in surface contact with the conductors;

measurement means for measuring residual amounts of charges in the battery cells after the battery cells are discharged by said discharge means;

recharging means for recharging the battery cells by amounts equal to the amounts of charges measured by said measurement means; and control means for controlling said electrically conductive means so that the electrical resistances of the conductors are selectively lowered, thereby allowing the charges recharged in the battery cells to be discharged through said developing electrode.

24. A positional information inputting device according to claim 23, further comprising monitoring means for monitoring an electromotive force of a battery cell immediately before said battery cell is charged by said charging means and an electromotive force thereof immediately after said battery cell is discharged in accordance with the irradiation of the optical beam onto the associated switching element.

25. A positional information inputting device according to claim 23, wherein each battery cell comprises a cathode-connected charge collecting layer, a cathode layer overlying said collecting layer, an electrolyte layer overlying said cathode layer, an anode layer overlying said electrolyte layer, and an anode-connected charge collecting layer overlying said anode layer.

26. A positional information inputting device according to claim 25, wherein the pressure-sensitive switching element comprises a pressure-sensitive layer, an electrically conductive layer overlying said pressure-sensitive layer, and a protective film laminated on said electrically conductive layer.

* * * * *